United States Patent [19]

Gore

[11] Patent Number: 5,231,938
[45] Date of Patent: Aug. 3, 1993

[54] SYSTEM FOR CONTAINMENT AND HANDLING OF HAZARDOUS MATERIALS

[76] Inventor: Douglas Gore, 181-C Mayhew Way, Walnut Creek, Calif. 94596

[21] Appl. No.: 816,388

[22] Filed: Dec. 24, 1991

[51] Int. Cl.$^5$ .............................................. F23G 7/00
[52] U.S. Cl. .................................. 110/346; 110/235; 206/524.1; 206/524.5; 588/249
[58] Field of Search ................... 110/346, 237, 235; 53/467, 476; 206/524.1, 524.5, 822; 588/249

[56] References Cited

U.S. PATENT DOCUMENTS

| | | | |
|---|---|---|---|
| 4,966,207 | 10/1990 | Howard et al. | 206/524.5 X |
| 5,058,513 | 10/1991 | Benoit et al. | 110/346 |
| 5,064,073 | 11/1991 | Folland | 206/822 X |

Primary Examiner—Edward G. Favors
Attorney, Agent, or Firm—Thomas M. Freiburger

[57] ABSTRACT

A system, method and apparatus for handling hazardous materials, including liquid and solid materials, includes as a central feature the encapsulation of materials into spherical capsules. The capsules, which may be in one preferred embodiment about 12 inches to 17 inches in diameter, may be formed of two connected hemispheres or as an integral ball with a fill opening. Once filled and sealed, the spherical balls are nearly indestructible (although incineratable) and a very high percentage of the balls will survive even in a collision of a vehicle carrying them. The system of the invention preferably includes a color coding scheme directly on the capsules for identifying the materials in the capsules both generally, with a background color, and more specifically, with one or more color bands. In one preferred embodiment the spherical balls, when filled with hazardous materials, have a specific gravity less than 1.0 so that they will float.

37 Claims, 5 Drawing Sheets

SYSTEM FOR CONTAINMENT AND HANDLING OF HAZARDOUS MATERIALS

BACKGROUND OF THE INVENTION

The invention relates generally to the handling of hazardous wastes and other hazardous materials. More specifically the invention is concerned with a new form of container for hazardous materials, as well as a system for handling, storing and transporting the hazardous material using containers in accordance with the invention.

The handling, storage and transport of hazardous materials, and particularly of hazardous wastes, has become a problem of major proportions. With regard to hazardous waste, the standard and in most instances the required form of containment has been the 55-gallon steel drum. These drums are biodegradable themselves, but this causes obvious problems in that the drums rust and decompose at dump sites and consequently leak hazardous, poisonous and carcinogenic compounds into the earth and the ground water supply.

In transportation of hazardous materials using the 55-gallon steel drums, the drums are easily ruptured if an accident occurs. A high impact against a gang of the drums in a truck accident, for example, can cause a sort of "domino effect" wherein sufficient impact is transferred to a great number of drums to rupture them. This is due to the basic cylindrical shape of the drum as well its relatively thin-walled construction, as relates to the bulk of its contents.

Another hazard occurs when the full drums are stacked, which they frequently are because their shape clearly lends itself to stacking. In many instances the drums have been stacked eight or nine tiers high. These drums often leak, with the leaking chemicals flowing down to mix with other leaking chemicals from other drums below. In this situation, even if the individual chemicals were not in themselves particularly hazardous, an unknown and hazardous combination can result.

Cylindrical drums are inherently reusable, even if not intended to be. Unwitting re-use with an incompatible chemical can cause an explosion or the creation of a dangerous, explosive, poisonous or otherwise hazardous combination. The inherent re-usability of cylindrical drums is a significant disadvantage.

When filled, cylindrical drums can be extremely heavy. A filled drum lying horizontally and leaking from one end can require six or seven men to right it, in order to patch the leak. An upright drum leaking from the side cannot be dropped over to the horizontal position for patching because this could cause the ends to fail.

In the disposal of hazardous waste materials, a large proportion of liquid and solid hazardous wastes cannot be neutralized by any practical method other than high temperature incineration. However, there have been only a handful of incinerators of this type to serve very large geographical areas, resulting in the need for extensive long-distance transportation of hazardous wastes. Since this transportation has been drum-based, the potential for severe accidents and even disasters has been quite high.

Cylindrical drums with explosive materials have been known to ignite and shoot through a building roof in the manner of a rocket. Explosive material can dry and harden from the outside in toward the center of the drum, leaving a hollow core which can act as a rocket nozzle.

There have been temporary storage containers known as "bladder bags", such as for containment of oil gathered from a spill or for some hazardous materials. However, these very flexible and relatively weak-walled bladder bags would not be suitable for the purposes of the present invention.

It is an object of the present invention to overcome these problems and to provide a safe and convenient system for handling, storing and transporting hazardous materials.

SUMMARY OF THE INVENTION

The present invention presents a new approach to containment, storage, handling and transportation of hazardous materials.

In preferred embodiments of the invention hazardous materials are loaded into spherical capsules, by a suitable filling means. The spherical capsules are of such material, wall thickness and diameter as to be substantially rigid. In preferred embodiments, the capsules when filled have the ability to withstand a reasonable drop test without rupture (for example, 20 to 40 feet, but varying depending on intended use and intended means of conveyance). Further, the preferred capsules have the ability to be contained in a mass at least 12 to 20 feet deep or even deeper in some circumstances, without any risk of fracture.

In one preferred embodiment each capsule has a visual identifying means on its surface for indicating the type of material contained in the capsule. This may comprise a background color on the capsule, to indicate generically a type of material in the capsule (such as acid, base, corrosive, flammable, etc.), and one or more color bands different from the background color, to indicate more specifically the material in the particular capsule. There may further be applied to each capsule a unique machine readable code such as a bar code. There may also be included on the capsule or a closure an automatic visual indicator such as a pH color indicator device.

In one aspect of the invention, the capsules, whether filled with liquid or solid material (or a mix of both), are filled only to the extent that their overall specific gravity is less than 1.0. Thus, the capsules or balls will float if dislodged from a vehicle or marine vessel and into water. They can easily be recovered from the surface of the water, making land to sea transfer feasible and safe (as for transfer to a marine vessel for offshore incineration). Further, these filled capsules can be transported by pipeline, in a liquid stream.

In one preferred embodiment the spherical capsules are of a diameter in the range of twelve inches to seventeen inches. More broadly, it is preferable that the size be in the range of about six inches to thirty inches, with size being a function of practical concerns such as specific gravity of the product to be carried and the transportation system being considered, as well as optimal wall thickness for the particular application. Economics of size and wall thickness play an important part. For any one handling system, the spherical balls should be generally the same size, although ball size in the system can be deliberately varied to some extent to facilitate sorting of different contents, for example. They may be formed, for example, of polyvinyl chloride with a wall thickness commensurate with the size of the capsule within this range. Teflon, Viton, Kynar, Dynel, Orlon, Noryl, ceramic or other materials which are relatively inert to a wide variety of substances (or to a specific substance) may be employed, depending on application and economics. For example, for a seventeen inch sphere the wall thickness may be from about 1/64 inch to two inches, depending on material, application and economics. In any event, it is preferred that the capsule material be nonbiodegradable (as that term is generally understood, meaning within decades or centuries) and also incineratable, such that the spherical container may be incinerated along with the contained hazardous waste.

The capsules may be formed as a pair of hemispheres which are secured and sealed together in the filling process. As an alternative, they may be integral except for a fill opening having a high-integrity seal. The capsules or capsule portions may be formed by rotational molding or blow molding, for example. They can also be formed of plastic-impregnated fabric, e.g. PVC impregnated fabric.

In another aspect of the invention, the filled spherical capsules form a part of a wide-ranging system wherein the colors on the balls or capsules not only identify generically and specifically the material in the capsule, but also provide a quick identifier for neutralizing or otherwise rendering harmless the contained material in the event of a rupture or spill. With a certain background color (e.g. red) universally identifying a particular hazardous material generically, such as acids, public officials such as state police and fire officials can carry in their vehicles a counteracting material of the same color, e.g. an alkaline material. The neutralizing capsules are also clearly identified as carrying the neutralizing agent rather than the hazardous material itself, and they are openable by the public official or capable of fracture in a certain way so as to quickly deliver the neutralizer onto the spilled hazardous material.

An important advantage of the invention is that the spherical capsules, in expanded use, become a recognizable symbol to the public, just as the skull-and-crossbones have come to symbolize poisons. The sphere symbol in an appropriate color can be printed on the sides of containers of consumer products which can ultimately become hazardous wastes (e.g. chlorine, brake fluid, pesticides, paint thinners, solvents), or on specialized transportation vehicles.

The system of the invention therefore presents an entirely new theory and approach to the problem of hazardous material handling and transport, an approach which results in a clear increase in safety over the use of drums and other containers, with far fewer leaks and spills. The spheres are inherently non-stackable in the manner of cylindrical drums. Instead, when a large mass of the filled balls are confined to a space such as a space within a warehouse or a high-sided truck bed, the spherical balls act to some extent as a fluid, specifically a liquid, settling into a pattern in the manner of lead shot or other spherical articles. Pressure is exerted on each ball at many points, rather than in the form of a single columnar axial force as in the case of stacked cylindrical drums. The spheres have a great resistance to crushing forces, and when the forces are spread out at many points in this way, the effective resistance is even greater.

With the system of the invention, based on the spherical containment capsules, a series of diverse, difficult to handle materials may all be put into respective capsules. With proper surface identification on the capsules the diverse hazardous materials can easily be handled with the capsules intermingled and transported as a single fluid mass.

Because the capsules are spherical and because they act together as a fluid mass, certain safety advantages result. For example, the balls cannot be fork lifted, nor can they be stacked, without an appropriate support structure. Unlike the drums which are inherently stackable (relying successively on their own structural strength for stacking) and fork-liftable, the spheres must be contained in some containment structure in order to be stacked or lifted. Appropriate containers (such as rectangular bins) will be dedicated to these purposes.

If an accident occurs during transport of the mass of filled capsules, a strong impact applied to the mass will have a very different effect than is the case with cylindrical drums. The mass of balls when impacted tends to spread in nearly every direction. This is particularly true in the case of an open-topped transport vehicle wherein the chances of the entire mass being crushed are minimal, and the balls have an opportunity to fly out in many directions. In such an accident a very high percentage of the spherical capsules will remain intact. No crushing impact loading is transferred to any ball or group of balls as in the case of drums, but such impact tends to be dispersed in all directions. Thus, in a closed truck or railroad car which is subjected to impact, even if the balls cannot escape, the force is spread to virtually all of the balls in the manner of a hydraulic cylinder, and pressure is dispersed so as to lower pressure on each ball. If the truck or other container is open or bursts or is not full, the balls are forced into other areas and even less force or pressure results on each ball.

Further, the capsules, each with specific gravity less than 1.0, can be transported through a pipe or canal by means of flowing water. They can be pushed by air through the pipeline or conduit or simply carried by the flowing water or other liquid. In contrast to drums, the balls can be transported by gravity or by an auger.

By the visual identifying scheme of the invention, the burning of the filled capsules at a high temperature incinerator can be better controlled. Different hazardous wastes require different burn temperatures, different amounts of oxygen, etc. for the most efficient burn. With each capsule bearing a visual identifier, preferably color, the temperature and other burn makeup can be adjusted when a stream of balls of one color shifts to a stream of another color.

Still further, simple signs can be used on transport vehicles, in storage areas and at incinerators to indicate the type of capsules that can be accepted and those which cannot, by color.

In another aspect of the invention, the spherical capsules are deliberately made non-reusable, to prevent the possibility of their carrying unidentified substances or being host to dangerous combinations unwittingly made. There has been enacted "cradle to grave" legislation which gives the creator of any hazardous material responsibility and liability for the material until such time as the material is certified as having been converted to a non-hazardous material or destroyed. With the container capsules of the invention being non-reusable, a system of accountability for contained materials can be established. Legislation can be enacted to require identifying marking on the exterior of all filled capsules, and to require certification (and consequent release of liability) when the filled capsule is destroyed or when it is emptied and the contents are converted to non-hazardous substances.

It is apparent that the spherical capsule hazardous material containers of the invention are fully applicable to the conventional system of transportation of hazardous materials, including rail, marine and road vehicles. Although there is a slight loss of transporting volume as compared to cylinders (essentially two-thirds of a storage volume is filled versus approximately 79% with drums), this is well compensated for by the increase in integrity and safety and the reduction of other costs. For example, overpack drums used for containment of leaking 55-gallon drums are quite costly, not to mention liability for drum spills and polluting leaks and the dump charges for acceptance of drums with unknown contents.

It is therefore among the objects of the present invention to provide and establish a unique and very different approach to the problem of containment, storage, handling, transportation and disposal of hazardous materials, in a system which is intrinsically much safer as well as more economical when all factors are considered. These and other objects, advantages and features of the invention will be apparent from the following description of preferred embodiments, considered along with the accompanying drawings.

DESCRIPTION OF PREFERRED EMBODIMENTS

Figures 1, 2, 3, 5:
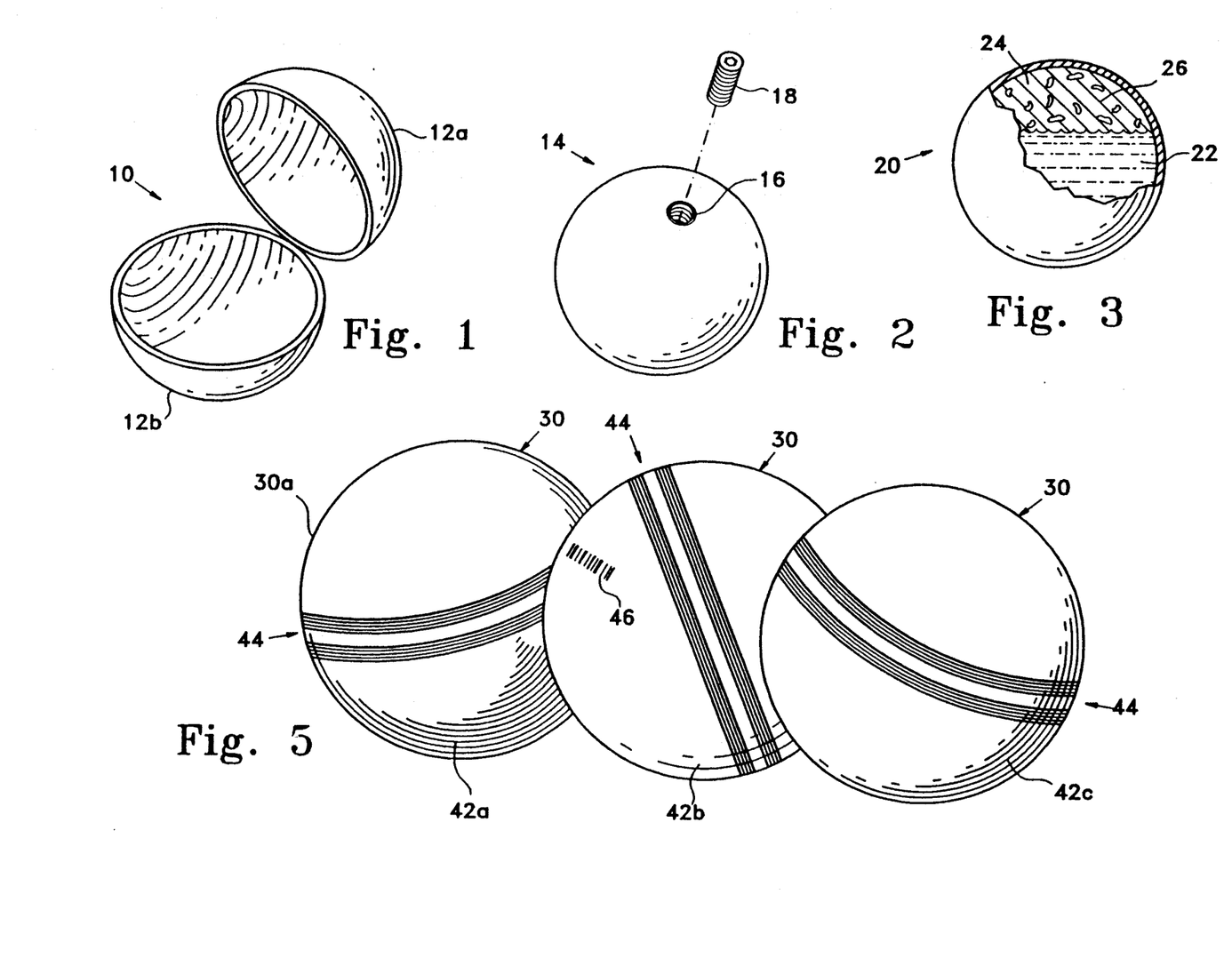
FIG. 1 is an exploded view showing a spherical capsule in accordance with the invention, formed of a pair of generally hemispherical components to be secured and sealed together upon filling.
FIG. 2 is a view showing a similar spherical capsule, but formed substantially integrally with a sealable fill opening.
FIG. 3 is another view showing a spherical capsule of the invention, partially cut away to show hazardous materials contained inside the capsule.
FIG. 5 is a view in perspective showing a series of spherical containment capsules according to the invention, each with a specific background color and a set of color bands different from the background color for indicating generally and more specifically the contents in the filled capsules.

In the drawings, FIG. 1 shows a spherical capsule container 10 in accordance with the invention, for containing liquid, solid or even gaseous hazardous materials. The container 10 of FIG. 1 is shown in two halves or hemispheres 12a and 12b, to be closed and hermetically sealed together upon filling of the capsule with hazardous material. In one preferred embodiment the closure and sealing of the hemispheres together is permanent and irreversible except on destruction of the capsule, and this is particularly applicable when the capsule contains hazardous waste to be incinerated, stored for a long period or otherwise disposed of. In another embodiment, the two hemispheres may be hermetically sealed together, but in a way such that the capsule is again openable by some means, whether that means be mechanical or chemical or by application of heat.

FIG. 2 shows a different embodiment of a spherical capsule in accordance with the invention. In this embodiment the spherical ball container 14 is essentially integrally formed but with a fill aperture 16 capable of forming a high integrity, hermetic seal. The fill opening 16 may comprise a threaded hole with a threaded plug 18 as shown, with both components preferably made of a high strength plastic such as polyvinyl chloride. Upon closure and sealing the plug 18 may be bonded into the threaded hole using a PVC cement (or a fusing solvent with many plastics), to form a substantially permanent closure.

If the hazardous material contained in the capsule 14 is not waste material but a material to be dispensed from the capsule, the plug 18 may be sealed in such a way that it can be reopened. However, in one aspect of a system in accordance with the invention the capsules are deliberately made non-reusable, for accountability and safety reasons. Thus, the plug or closure may be removable to dispense the product but in such a way as to render the capsule non-reusable. The plug itself may be non-removable, requiring another opening to be made to remove product.

FIG. 3 shows a spherical capsule 20 partially cut away to show contents 22 comprising hazardous material. FIG. 3 illustrates that in a preferred embodiment the spherical container 20 is not completely filled with the material 22, but includes a space 24 sufficient that the overall filled and sealed container will have a weight which is less than that of an equal volume of water, i.e. its specific gravity is less than 1.0. The space 24 may be filled with a foam 26 which is non-reactive with the hazardous material 22, to prevent excessive sloshing movement of the hazardous material within the container during transport. Alternatively, this purpose can be addressed with another material or with suitable baffling in the capsule.

As mentioned above, with a specific gravity less than 1.0 the filled container will float on liquid, making the capsules easily retrievable if in water and making them transportable via a liquid-bearing pipeline.

Figure 4:
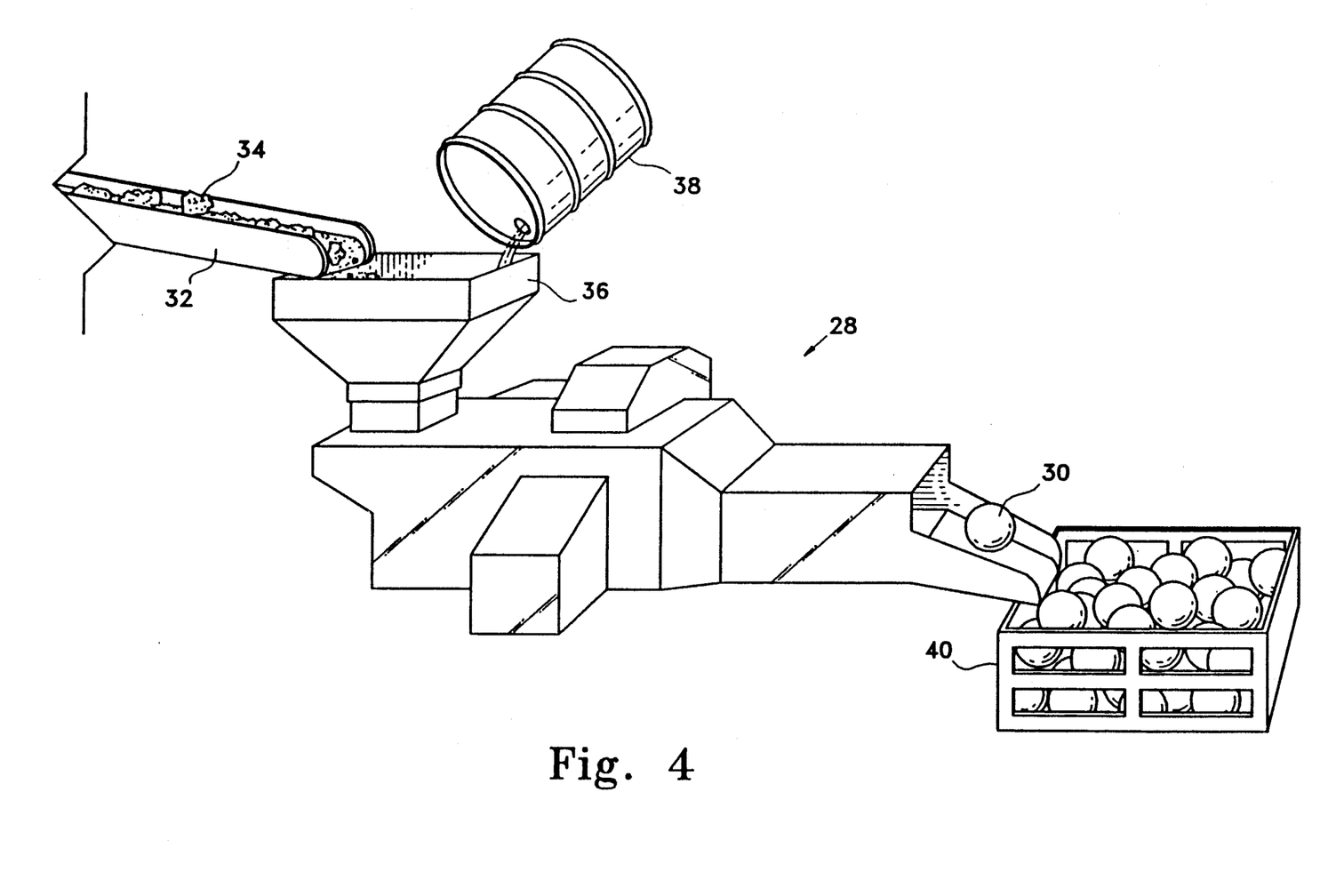
FIG. 4 is a perspective view indicating somewhat schematically the machine filling of capsules with hazardous materials.

FIG. 4 schematically indicates a machine or apparatus 28 for receiving hazardous materials from any of several sources and filling the spherical capsules 30 with the material. In FIG. 4 a conveyor 32 is shown delivering solid hazardous material 34 into a hopper 36 of the filling apparatus, and a drum 38 is shown delivering liquid into the hopper. The figure is not intended to indicate that both hazardous waste materials would be loaded into the hopper and the machine together, although this could be the case provided the combination is not reactive in a deleterious way, including during incineration if the materials are hazardous wastes. FIG. 4 merely shows that different sources and types of hazardous materials may be loaded into the hopper for filling of the capsules 30 by the machine.

As also illustrated in FIG. 4, the filled capsules 30 are dispensed from the machine in closed, hermetically sealed configuration and they act somewhat as a fluid-like mass when collected in a container 40. They tend to seek a common surface level in the manner of a liquid, and they tend to exert pressures in horizontal directions as well as vertical, in the manner of a liquid. Also, although not shown in the schematic view of FIG. 4, the filled balls 30 when confined as a fluid mass tend to settle into an ordered pattern somewhat like a crystalline structure, with each ball in the mass contacted by a number of surrounding balls from generally all directions.

The specific manner in which the filling machine 28 fills the spherical capsules 30 with solid or liquid hazardous material can take several forms. As explained previously, the capsules can be assembled from a pair of halves or hemispheres (FIG. 1) or can be filled via a closable opening (FIG. 2). The manner in which the machine operates is well within the ordinary skill of the package and container filling field and does not in itself form a specific part of the invention.

FIG. 5 illustrates an important aspect of the present invention, i.e. the inclusion of one or more visual identifying features on each filled spherical capsule 30. In a preferred embodiment, as discussed above, a background color 42 generally identifies the type of substance carried in the container, with different background colors 42a, 42b and 42c shown in FIG. 5. These might identify, for example, corrosives in general, acid materials in general, and alkaline materials in general.

As also discussed previously, each capsule 30 includes a further, specific identifying feature which may be one or more color bands generally identified as 44. FIG. 5 shows each capsule or ball 30 as having three color bands 44 in different combinations. Thus, if the capsule 30a on the left in FIG. 5, for example, contains nitric acid, 30% concentration, the background color 42a might indicate an acid, while the combination of color bands 44 can indicate the acid type and concentration. However, this is merely an example, and the background color and color bands can be used in a number of different ways to provide information about the contents. For example, the background color could indicate the degree of hazard of the particular contents, rather than the general type of chemical contained.

FIG. 5 also shows that a machine readable code 46 such as a bar code can be imprinted on each of the spherical capsules 30. This can be a unique symbol for each sphere or the same symbol can be used for all identically-filled capsules. Bar code reading beams, each generating a plurality of scan lines, can be located at several positions in the path of travel of the spherical capsules 30 in the handling or travel toward incineration of the capsules, so that each capsule is automatically read and identified during the process.

Figure 6:
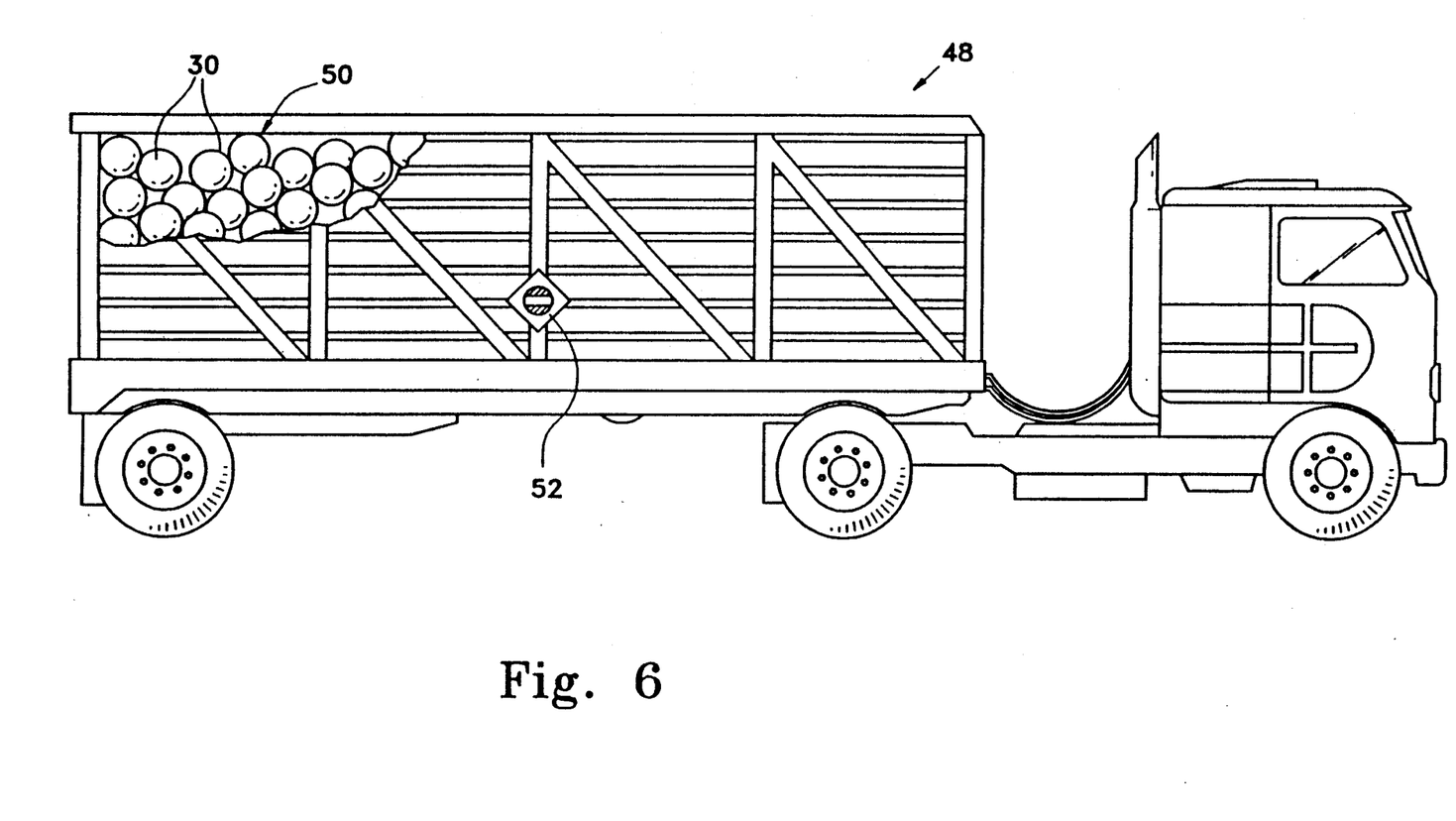
FIG. 6 is an elevation view showing a transport vehicle for carrying the filled spherical capsules containing hazardous material. A portion of the vehicle is cut away to show the mass of capsules inside.

FIG. 6 shows a transport vehicle 48 carrying hazardous materials contained in the sealed spherical capsules 30 of the invention. In FIG. 6 the vehicle, a semi-trailer truck, is shown with a side partially cut away to reveal a mass of the spherical containers 30. As discussed above, the spherical capsules 30 act in some ways as a liquid poured into a container such as the truck 48. They form generally a surface level 50 indicated in FIG. 6. If subjected to a strong impact in an accident, the spheres would tend to spray outwardly omnidirectionally, generally in the manner a liquid would react. Similarly, the mass of containers 30 can tend to surge forward on sudden deceleration, and it is therefore preferable that some form of cover, such as a flexible cover, be included on the top of the truck 48.

FIG. 6 also shows a symbol 52 which may be a part of the handling, storage and transportation system of the invention. The symbol 52 signifies that hazardous materials are being transported and represents the spherical capsules 30 of the invention.

Figure 7:
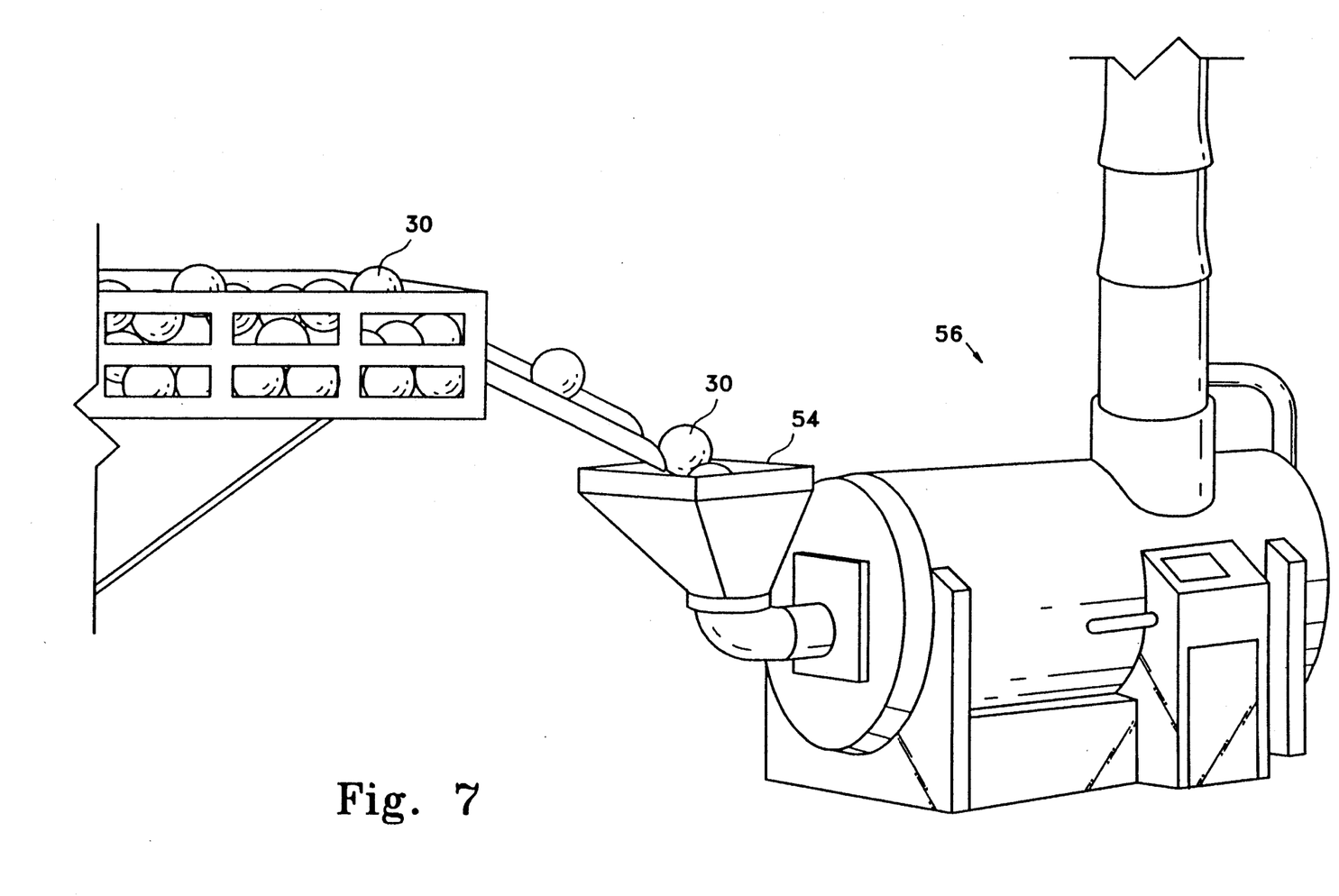
FIG. 7 is a schematic view in perspective, illustrating the feeding of a stream of filled spherical capsules into a high-temperature incinerator, in accordance with the system and principles of the invention.

FIG. 7 shows schematically the feeding of filled hazardous waste capsules 30 into a hopper 54 of a high-temperature hazardous waste incinerator 56. The capsules 30 are incinerated along with the hazardous waste which they contain, and as discussed above, the material of the capsules 30 is selected so as to be incineratable, with PVC being an example of a material useful for handling most chemicals.

As also discussed above, the operating parameters of the high temperature incinerator 56 can be adjusted based on the identity of the hazardous waste being conveyed into the hopper 54. The background color can indicate generally the type of material flowing as a stream into the incinerator at any given time. When the background color changes, i.e. the stream of waste material changes to a different type, the operating parameters of the incinerator can be adjusted accordingly.

As discussed above relative to FIG. 5, if bar codes 46 or other machine readable codes are included on each spherical capsule 30, these can be machine-read automatically as the spheres travel in a single-file stream toward the incinerator 56. The operating parameters of the incinerator can then be changed automatically, based on information looked up automatically from a computer database regarding the contents represented by each bar code symbol read.

Figure 8:
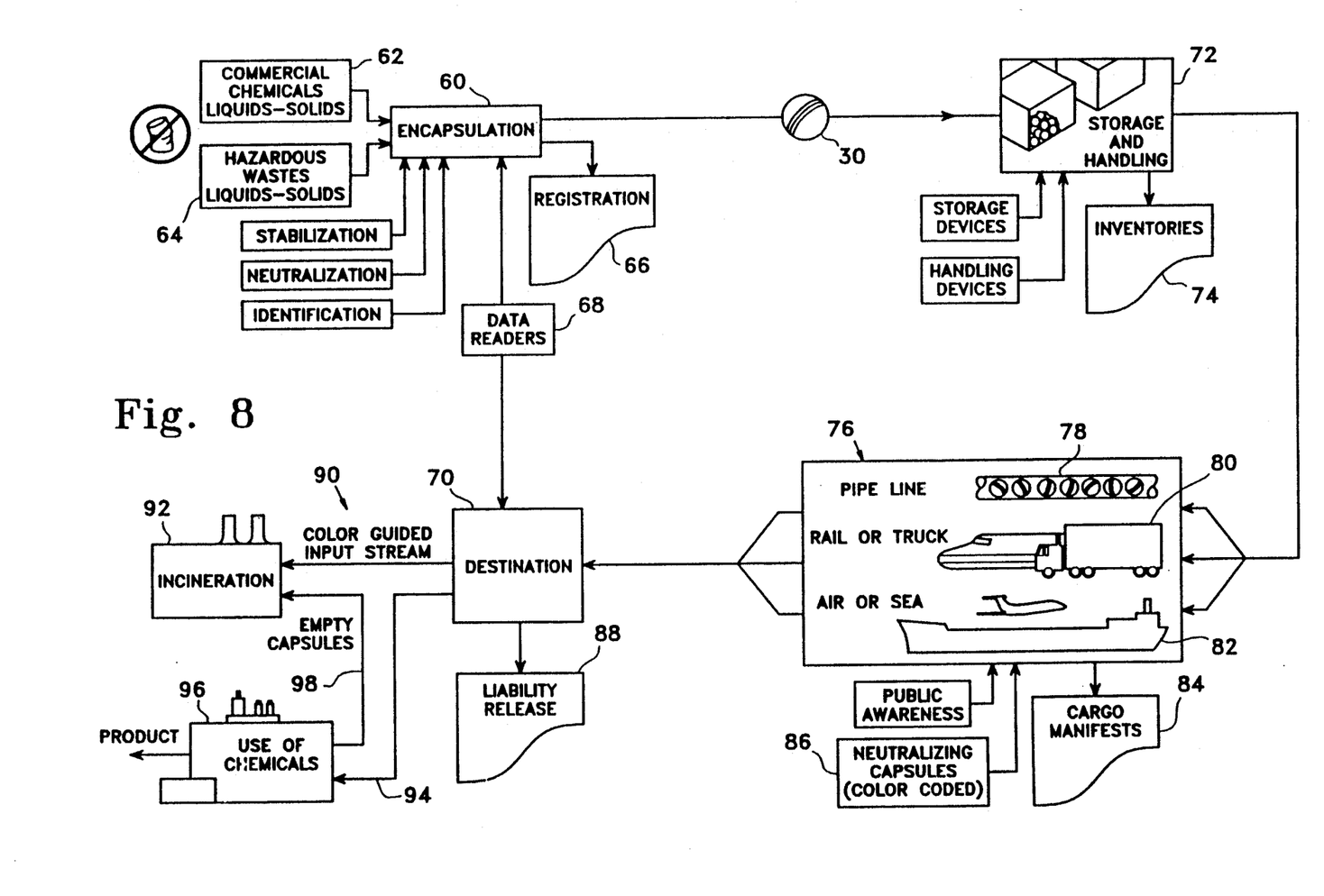
FIG. 8 is a diagram illustrating an overall system in accordance with the invention, involving encapsulation, storage and handling, transportation, incineration and tracking of hazardous materials.

FIG. 8 is a simplified system diagram, a form of system flow chart indicating the various aspects and progression of features of the present invention. The flow chart of FIG. 8 is schematic and indicates the encapsulation of hazardous materials and wastes into the capsules and through storage and handling, transportation, separation and incineration steps.

FIG. 8 shows encapsulation 60 of commercial chemicals 62 as well as hazardous wastes 64. The figure indicates input of stabilization and neutralization for the chemicals, as well as identification which may be through color coded bands as discussed above. Further, the schematic diagram shows registration 66 of all hazardous material containing capsules 30. Data readers are shown at 68 for tracking the chemicals, from the time they are handled at the encapsulation step 60 through the ultimate destination and disposition of the chemicals, as indicated at 70 in the drawing.

Following encapsulation, with the related steps as discussed, the drawing indicates storage and handling 72, with inventory again taken at 74 as part of the tracking process. The schematic diagram then illustrates that the capsules may undergo transportation 76, as by pipeline 78, truck or rail 80, or air or sea 82. Cargo manifests are indicated at 84, emanating from the transportation operation and forming a part of the tracking process. One of the inputs to the transportation of the capsules is a preferred feature of the invention wherein neutralizing capsules 86 preferably are made available for neutralizing any chemicals which have been spilled by accident. These neutralizing capsules, preferably color coded to indicate to officials which capsules are appropriate for particular color-coded hazardous materials capsules 30, may be carried by public officials in public vehicles.

At the destination 70 as shown in the flow chart, liability release 88 is obtained, if the capsules have been fully tracked and registered, with inventories and cargo manifests matching at all points.

At the destination 70, the capsules can be separated as generally shown at 90, with the color guided input stream permitting separation of the capsules into those carrying hazardous wastes, to be incinerated at 92, and those carrying useful commercial chemicals, indicated in a flow at 94 to a use point 96. The diagram also indicates at 98 that empty capsules from which commercial chemicals have been removed may be incinerated for disposal.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A system for containment, storage and transport of hazardous materials, comprising,
   a plurality of substantially rigid spherical capsules, each having filling means for receiving hazardous material,
   material loading means for handling a quantity of hazardous material, for filling a plurality of the spherical capsules with the material, and for sealing the capsules closed,
   and visual identifying means on the surface of each capsule for indicating the type of material carried in the capsule.

2. The system of claim 1, wherein the visual identifying means comprises, on each capsule, a background color indicating generically a type of material contained in the capsule and at least one color band different from the background color indicating more specifically the contents of the capsule.

3. The system of claim 1, wherein the spherical capsules are formed of polyvinyl chloride.

4. The system of claim 1, wherein the spherical capsules are formed from one of the following: polyvinyl chloride, Teflon, Kynar, Dynel and Orlon.

5. The system of claim 1, wherein the material loading means includes weight control means for filling each spherical capsule with hazardous material only to the extent that the filled, sealed capsule has a specific gravity less than 1.0.

6. The system of claim 5, wherein the visual identifying means comprises, on each capsule, a background color indicating generically a type of material contained in the capsule and at least one color band different from the background color indicating more specifically the contents of the capsule.

7. The system of claim 1, wherein the spherical capsules are all of substantially uniform size, the size being up to about seventeen inches outside diameter.

8. The system of claim 1, wherein the spherical capsules have a size in the range of about six inches to thirty inches outside diameter.

9. The system of claim 8, wherein the capsules have a size in the range of about twelve inches to seventeen inches outside diameter.

10. The system of claim 1, further including specific batch identifying means comprising a machine-readable code on each individual spherical capsule.

11. The system of claim 1, wherein the spherical capsules are incineratable along with the material contained.

12. The system of claim 1, wherein each capsule has means for substantially preventing re-use after the material has been emptied from the capsule.

13. A method for containing, storing, transporting and handling of hazardous materials, comprising,
    feeding a quantity of hazardous material comprising liquid material, solid material or a combination of liquids and solids, to a material loading machine,
    with the material loading machine, filling a large plurality of spherical capsules with the hazardous material, and hermetically sealing each capsule upon filling, and
    transporting the filled, sealed spherical capsules as a fluid-like mass of the capsules, in a transporting vehicle, to a selected destination.

14. The method of claim 13, wherein the step of filling the spherical capsules comprises assembling a pair of generally hemispherical halves together with the hazardous material contained therein.

15. The method of claim 13, wherein the spherical capsules are of a diameter between about twelve inches and seventeen inches.

16. The method of claim 13, including filling each spherical capsule with material only to the extent that the filled and sealed capsule has a specific gravity less than 1.0 whereby the capsules will float in water.

17. The method of claim 13, further including identifying generally the contents of each filled capsule using a visually identifiable color.

18. The method of claim 17, further including identifying the contents of each capsule more specifically by using at least one color band of a different color from the background color.

19. The method of claim 16, further including transporting some of the filled spherical capsules through a pipeline within which liquid flows.

20. The method of claim 13, wherein the hazardous material comprises waste material, wherein the spherical capsules are incineratable, and wherein the method includes disposing of the capsules along with the hazardous waste by incinerating the capsules and waste together.

21. The method of claim 20, wherein each spherical capsule includes a means for substantially preventing re-use of the capsule.

22. The method of claim 20, wherein the incineratable spherical capsules are formed of polyvinyl chloride.

23. The method of claim 13, wherein the step of filling and sealing the capsules comprises forming a permanent seal such that the spherical capsules cannot be opened without destruction.

24. The method of claim 13, wherein all spherical capsules are of substantially the same size.

25. The method of claim 13, wherein the spherical capsules are non-biodegradable.

26. The method of claim 25, wherein the spherical capsules are incineratable.

27. The method of claim 13, further including transporting a plurality of the filled spherical capsules using an egg carton-type pallet capable of use with a forklift.

28. The method of claim 13, further including applying identifying indicia to each filled capsule to identify generally the type of hazardous material, and including providing public service vehicles with neutralizing substances contained in openable capsules having a similar identifying indicia, whereby in the event any of the filled capsules is accidentally broken and opened and spills hazardous material, the hazardous material can be neutralized by public service employees carrying capsules with counteracting, neutralizing substances at the site of the spill.

29. The method of claim 13, further including providing a plurality of neutralizing capsules carrying chemicals which will neutralize or reduce the hazardous effect of materials carried in said spherical capsules when mixed with said materials, the neutralizing capsules carrying different chemicals for different purposes; providing coding on both the hazardous material containing spherical capsules and on the neutralizing capsules which will enable public officials to identify the appropriate neutralizing capsules in the event of an accident involving the hazardous material containing capsules; and storing the neutralizing capsules in appropriate places for use by public officials in the event of an accident.

30. A container carrying hazardous waste, comprising,
- a substantially spherical capsule formed of incineratable plastic material,
- hazardous waste material contained in the spherical capsule, the walls of the capsule contacting the waste material being non-reactive with and not attackable by the particular waste material,
- and fill means for permitting the introduction of the hazardous waste material into the capsule, the fill means and the capsule being closed and hermetically sealed substantially permanently,
- whereby the plastic spherical capsule may be disposed of together with the hazardous waste in a high temperature incinerator.

31. The apparatus of claim 30, wherein the spherical capsule is filled with the waste material only to the extent that the specific gravity of the filled capsule is less than 1.0, whereby the filled, sealed capsule with hazardous waste will float on water.

32. The apparatus of claim 30, wherein the capsule is formed of polyvinyl chloride.

33. The apparatus of claim 30, wherein the fill means comprises the capsule being formed of a pair of hemispherical halves assembled and sealed together to contain the waste material.

34. The apparatus of claim 30, wherein the fill means comprises a sealable opening on one position on the otherwise integral spherical capsule.

35. A container carrying hazardous material, comprising,
- a substantially spherical capsule formed of plastic material,
- hazardous material contained in the spherical capsule, the hazardous material comprising material whose chemical makeup is inherently capable of causing harm if coming into contact with living beings, or which is liable if spilled or released to be inadvertently combined with other substances to form a hazardous material,
- the walls of the capsule contacting the material being non-reactive with and not attackable by the particular material,
- and fill means for permitting the introduction of the hazardous material into the capsule, the fill means and the capsule being closed and hermetically sealed.

36. A container according to claim 35, further including means for substantially preventing re-use of the capsule.

37. A container according to claim 36, wherein the re-use preventing means comprises said fill means having permanent sealing means for preventing opening of the capsule without destruction.

* * * * *